United States Patent Office.

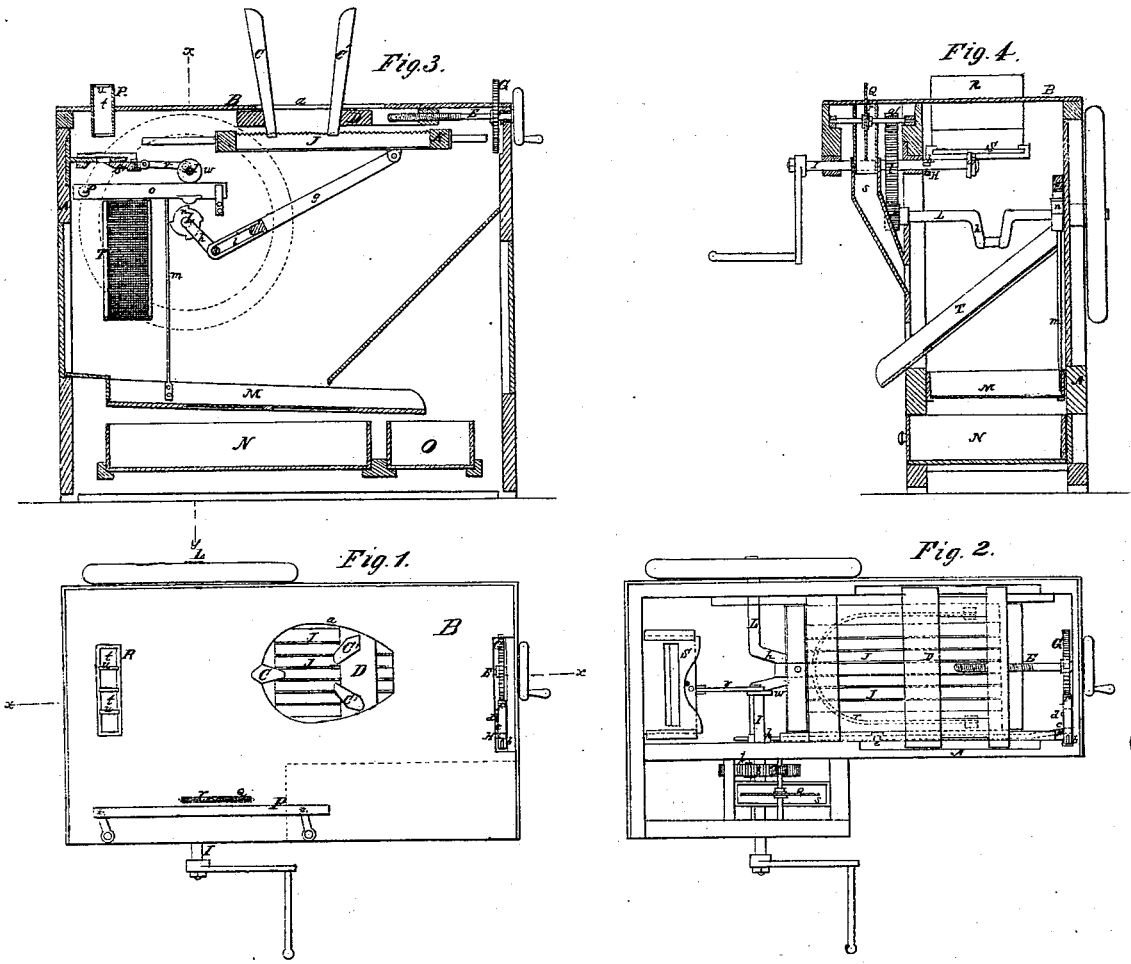

ALEXANDRE EMILE LETOREY, OF ROUEN, FRANCE.

Letters Patent No. 93,894, dated August 17, 1869.

IMPROVED MACHINE FOR CUTTING AND REDUCING LOAF-SUGAR.

The Schedule referred to in these Letters Patent and making part of the same.

*To all whom it may concern:*

Be it known that I, ALEXANDRE ÉMILE LETOREY, of the city of Rouen, in the Empire of France, have invented certain new and useful Improvements in Machines for Cutting and Reducing Loaf-Sugar, of which the following is a full, clear, and exact description, reference being had to the accompanying drawing, forming part of this specification, and in which—

Figure 1 represents a plan of a machine constructed in accordance with my invention;

Figure 2 is a similar view, with the top removed;

Figure 3, a sectional elevation, taken as indicated by the line $x\ x$ in fig. 1; and Figure 4, a transverse section, taken as denoted by the line $y\ y$ in fig. 2.

Similar letters of reference indicate corresponding parts.

My invention consists in certain arrangements and combinations of mechanism for breaking or reducing, by sawing and cutting, sugar in the loaf into small pieces, in a uniform and regular manner.

Referring to the accompanying drawing—

A represents the frame of the machine.

B, a top board or cover, in which are arranged necessary openings, for conducting the several operations on the sugar.

The one, $a$, of these openings serves to receive through it the loaf-sugar, which is deposited, with its small end downward, between guides C C' C', set to occupy an angular position.

The front one, C, of these guides may be a fixture, or be hinged so as to vary its angular set.

The back guides C' C' are attached to a sliding frame, D, which is adjustable, relatively to the front guide C, either automatically or by hand, to effect feed of the loaf down between the guides, and to facilitate entry; also, if necessary at any time, removal of the sugar.

Hand-adjustment of the same is effected by means of a screw, E, arranged to work through a box in the sliding frame D, and operated by a suitable handle on the exterior, on throwing a pawl, F, out of gear with a ratchet-wheel, G, made fast to said screw.

This pawl F is hinged, as at $b$, to a lower arm, $c$, pivoted as at $d$, which lower arm rests upon the one end of a lever, H, pivoted as at $e$, and operated intermittently at its other end by a pin, $f$, arranged to project radially from a revolving main shaft, I, which may be driven by hand, or any suitable power, so that the pawl F gives intermittent motion, through the ratchet-wheel G, to the screw E, to secure to the guides C' C' the necessary opening or back action, to allow of the loaf dropping at intervals, in regular succession, for the purpose of feeding it down against and between a gang of saws, J J, carried by a horizontally-reciprocating frame K, that may be driven by a bowed strap, $g$, through a crank, $h$, of a revolving shaft, L, which strap is slotted, as at $i$, to effect its operation by the crank.

Said shaft L is driven by a pinion, $k$, through a spur-wheel, $l$, on the main shaft I.

The loaf of sugar, as thus operated upon, is sawed into slabs, which are received below, and removed through any suitable side-opening, or otherwise, while the cuttings and dust, made by sawing the sugar, fall on to the screen M, which serves to sift the finer particles into a box or drawer, N, and to pass off the larger particles into a separate drawer, O, said screen being shaken by a rod or rods, $m$, through a many-leafed cam, $n$, on the shaft L, operating under or against a lever or frame, $o$, pivoted as at $p$.

The slabs of sugar are thus taken in succession, and run or slid repeatedly over the top board B, under guidance of an adjustable parallel gauge P, against a circular saw, Q, to cut each slab into sticks, said circular saw being driven by a pinion, $q$, through the spur-wheel $l$ on the main shaft I.

The dust or broken particles produced by such sawing fall through the saw-race or opening $r$, and down a conductor, $s$, on to the screen M below.

After the slabs have thus been sawed into sticks, the latter are inserted endwise down into and through chambers $t$, formed in a vertical box, R, by partitions $u$, which may be made adjustable in the box, by arranging them to fit any of a series of vertical grooves, cut in the sides thereof, to suit different widths or thicknesses of sticks.

The sticks of sugar, as thus located, drop by their weight on to any suitable gauge, below a horizontally-reciprocating knife, S, arranged under a guide, situated at a proper distance below the chambers $t$, and which serves, as the sticks drop, to intersect and cut them into small pieces or lumps of a uniform size, which lumps are delivered down a screen-chute, T, through a side-opening in the frame of the machine, while the finer particles and dust, produced by the operation of cutting, drop through the screen-portion of said chute, on to the screen M below, that thus serves to sift all the loose or broken particles made in the several operations of sawing and cutting.

The knife S may be reciprocated by a rod, U, through an eccentric wrist-pin on a disk, W, carried by the main shaft I.

The several operations of sawing and cutting, it will be observed, may be conducted simultaneously on more than the one loaf. Thus, while one loaf is being sawed into slabs, the slabs formed by a previous loaf may be undergoing the process of being sawed up into sticks, and these latter, as fast as they are made, or sticks formed out of or from still another loaf, may be going through the operation of being cut up into small pieces or lumps.

What is here claimed, and desired to be secured by Letters-Patent, is—

1. The combination of the horizontally-reciprocating saws J, the circular saw Q, and the reciprocating knife S, for successively reducing the loaf into slabs, sticks, and lumps, substantially as specified.

2. The combination, with the saws J, of the incline guides C and C' C', the latter of said guides C C having a sliding or feeding motion given them, to allow of the descent of the loaf to and through between the saws, essentially as described.

3. The combination, with the reciprocating knife S, of the vertical box R, partitioned off into chambers t, as specified, and arranged, in relation to the knife, substantially as herein set forth.

4. The combination of the screen M with the reciprocating saws J, the circular saw Q, and the reciprocating knife S, essentially as and for the purposes described.

In testimony whereof, I have signed my name to this specification, before two subscribing witnesses.

AL. LETOREY.

Witnesses:
R. HUNON,
E. LEFÉVRE.